(12) United States Patent
Dattatri et al.

(10) Patent No.: US 12,110,118 B2
(45) Date of Patent: Oct. 8, 2024

(54) LASER WELDED PNEUMATIC DEICER BOOTS FOR AIRCRAFT

(71) Applicant: GOODRICH CORPORATION, Charlotte, NC (US)

(72) Inventors: Shyam Kumar Dattatri, Bangalore (IN); Harish Venkateshaiah, Bangalore (IN); Rhushikesh Patil, Bangalore (IN); Harshavardhana Nanjundegowda, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 105 days.

(21) Appl. No.: 17/859,416

(22) Filed: Jul. 7, 2022

(65) Prior Publication Data

US 2023/0312112 A1    Oct. 5, 2023

(30) Foreign Application Priority Data

Apr. 1, 2022  (IN) .............................. 202241019968

(51) Int. Cl.
*B64D 15/16* (2006.01)
*B29C 65/14* (2006.01)
(Continued)

(52) U.S. Cl.
CPC ........ *B64D 15/166* (2013.01); *B29C 65/1412* (2013.01); *B29C 65/1432* (2013.01);
(Continued)

(58) Field of Classification Search
CPC .. B64D 15/00; B64D 15/166; B29C 65/1412; B29C 65/1432; B29C 65/1438;
(Continued)

(56) References Cited

U.S. PATENT DOCUMENTS 5,310,142 A    5/1994  Weisend, Jr.
5,558,304 A *  9/1996  Adams ................... B64D 15/00
                                                   244/134 A
(Continued)

FOREIGN PATENT DOCUMENTS

CA       3193294 A1 * 10/2023  ......... B29C 65/1412
CN       108857068       11/2018
(Continued)

OTHER PUBLICATIONS

European Patent Office, European Search Report dated Jun. 27, 2023 in Application No. 23162951.0.
(Continued)

*Primary Examiner* — Benjamin P Lee
(74) *Attorney, Agent, or Firm* — SNELL & WILMER L.L.P.

(57) ABSTRACT

Ice may form along the leading edge of an aircraft wing or horizontal and vertical stabilizers. A pneumatic deicer system may be configured to inflate and dislodge ice along the leading edge of lift and control surfaces. The pneumatic deicer system may comprise a laser welded deicing boot attached to the leading edge. The compressed air can be directed to the deicing boot, inflating the deicing boot along inflatable tubes formed by laser welds, which can crack and dislodge the ice. A method of manufacturing a laser welded pneumatic deicer boot is also disclosed.

20 Claims, 7 Drawing Sheets

(51) Int. Cl.
  *B32B 3/08* (2006.01)
  *B32B 7/12* (2006.01)
  *B32B 27/12* (2006.01)
  *B32B 27/34* (2006.01)
  *B29L 22/02* (2006.01)

(52) U.S. Cl.
  CPC ............ *B29C 65/1438* (2013.01); *B32B 3/08* (2013.01); *B32B 7/12* (2013.01); *B32B 27/12* (2013.01); *B32B 27/34* (2013.01); *B29L 2022/02* (2013.01); *B32B 2250/04* (2013.01); *B32B 2255/02* (2013.01); *B32B 2255/26* (2013.01); *B32B 2255/28* (2013.01); *B32B 2307/51* (2013.01); *B32B 2605/18* (2013.01)

(58) Field of Classification Search
  CPC ........... B32B 7/12; B32B 27/12; B32B 27/34; B32B 2250/04; B32B 2255/02; B32B 2255/26; B32B 2255/28; B32B 2605/18
  See application file for complete search history.

(56) References Cited

U.S. PATENT DOCUMENTS

| | | | | |
|---|---|---|---|---|
| 5,693,412 | A * | 12/1997 | Walters | B32B 5/026 |
| | | | | 428/317.1 |
| 6,283,411 | B1 * | 9/2001 | Giamati | B64D 15/12 |
| | | | | 244/134 A |
| 11,142,324 | B2 * | 10/2021 | Briand | B29C 66/433 |
| 2005/0181168 | A1 * | 8/2005 | Barnes | B29C 65/14 |
| | | | | 428/57 |
| 2016/0332434 | A1 * | 11/2016 | Moore | B29C 70/388 |
| 2016/0339664 | A1 * | 11/2016 | Gallagher | B32B 7/12 |
| 2017/0266753 | A1 * | 9/2017 | Schomer | B29C 66/438 |
| 2017/0266869 | A1 * | 9/2017 | Schomer | B64D 15/166 |
| 2017/0273148 | A1 * | 9/2017 | Schomer | B29C 66/81427 |
| 2019/0152613 | A1 * | 5/2019 | Hu | B64D 15/166 |
| 2019/0185168 | A1 * | 6/2019 | Hunter | B64D 15/166 |
| 2020/0361613 | A1 * | 11/2020 | Giamati | B64D 15/12 |
| 2021/0078718 | A1 | 3/2021 | Bourhis et al. | |

FOREIGN PATENT DOCUMENTS

| | | | | |
|---|---|---|---|---|
| DE | 102019132532 | A1 * | 6/2021 | |
| EP | 3219463 | A1 * | 9/2017 | ............ B29C 65/04 |
| EP | 3219464 | | 9/2017 | |
| EP | 3219464 | A1 * | 9/2017 | ............ B23K 20/10 |
| EP | 3219621 | A1 * | 9/2017 | ............ B29C 65/04 |

OTHER PUBLICATIONS

Vatterodt, et al: "Textilschweissen" Kunststoffe, Carl Hanser Verlag, Munchen, DE, No. 10, dated Oct. 10, 2006, pp. 221-224, XP001525361, ISSN: 0023-5563 (in German).

Backmann, et al.: "Textilschweissen—Thermisches Fugen und Verbinden von Textilien fur Orthopadie- und Medizintechnik" Internet citation, dated Jan. 1, 2004, pp. 1-21, XP002503268, retrieved from the Internet URL: http://www.grin.com/e-book/111374/textilscheissen-thermisches-fuegen-und-verbinden-von-textilien-fuer-orthopaedie, (in German).

* cited by examiner

LASER WELDED PNEUMATIC DEICER BOOTS FOR AIRCRAFT

CROSS-REFERENCE TO RELATED APPLICATIONS

This application claims priority to, and the benefit of, India Provisional Patent Application No. 202241019968, filed Apr. 1, 2022 (DAS Code 62BD) and titled "LASER WELDED PNEUMATIC DEICER BOOTS FOR AIRCRAFT," which is incorporated by reference herein in its entirety for all purposes.

FIELD

This disclosure relates generally to pneumatic deicers for aircraft, more specifically, deicer boots which are laser welded.

BACKGROUND

Pneumatic deicer boots are a type of ice protection system installed on aircraft to allow deicing in flight. The deicing boots may consist of thick polymer, stretchable composite materials and non-stretchable composite materials installed to the leading edge of any lifting or control surface, such as wings and stabilizers. As atmospheric icing occurs and ice builds up, the pneumatic deicer boot may pressurize and inflate. Pneumatic deicer boots typically rely on compressed air for inflation. Cooled bleed air may be used to inflate the deicing boots.

SUMMARY

A method of manufacture for a pneumatic deicer boot is disclosed herein. In various embodiments, the method of manufacture can comprise forming an installation layer, forming an inflatable carcass, and bonding the installation layer to the non-stretchable fabric layer of the inflatable carcass. In various embodiments, the forming of the inflatable carcass can comprise aligning a non-stretchable fabric layer and a stretchable fabric layer at a welding position, generating a concentrated laser; focusing the concentrated laser along a first weld line to laser weld together the stretchable fabric layer and the non-stretchable fabric layer, focusing the concentrated laser along a second weld line to laser weld together the stretchable fabric layer and the non-stretchable fabric layer, wherein a gap remains between the stretchable fabric layer and the non-stretchable fabric layer. In various embodiments, the gap, the first weld line and the second weld line form a first inflatable tube. In various embodiments, the concentrated laser can be an infrared laser.

In various embodiments, the method of manufacture can further comprise forming a polymer layer on the stretchable fabric layer of the inflatable carcass. In various embodiments, the method of manufacture can further comprise forming a weathering layer on the polymer layer. In various embodiments, the method of manufacture can further comprise bonding an air inlet to the installation layer.

In various embodiments, the non-stretchable fabric layer can comprise nylon coated with a first polymeric coating compound. The stretchable fabric layer can comprise nylon coated with a second polymeric coating compound. In various embodiments, the second polymeric coating compound can be thicker than the first polymeric coating compound.

A pneumatic deicer boot is disclosed herein. In various embodiments, the pneumatic deicer can comprise an installation layer and an inflatable carcass. In various embodiments, the inflatable carcass can comprise a non-stretchable fabric layer, a stretchable fabric layer, and an inflatable tube. In various embodiments, the non-stretchable fabric layer and the stretchable fabric layer can be laser welded together at a first weld line and a second weld line. In various embodiments, the pneumatic deicer boot can further comprise a polymer layer. In various embodiments, the pneumatic deicer boot can further comprise a weathering layer. In various embodiments, the pneumatic deicer boot can further comprise a manifold in fluid communication with the first inflatable tube. In various embodiments, the pneumatic deicer boot can further comprise an air inlet disposed at the installation layer and in fluid communication with the manifold.

In various embodiments, the non-stretchable fabric layer can comprise nylon coated with a first polymeric coating compound. The stretchable fabric layer can comprise nylon coated with a second polymeric coating compound. In various embodiments, the second polymeric coating compound can be thicker than the first polymeric coating compound.

A pneumatic deicer system is disclosed herein. The pneumatic deicer system can comprise a pneumatic deicer boot and a compressed air source in fluid communication with the pneumatic deicer boot. In various embodiments, the pneumatic deicer boot can comprise an installation layer, an inflatable carcass bonded to the installation layer, and an air inlet coupled to the installation layer. In various embodiments, the inflatable carcass can further comprise a non-stretchable fabric layer, a stretchable fabric layer, wherein the non-stretchable fabric layer and the stretchable fabric layer are laser welded together at a first weld line and a second weld line, and a first inflatable tube. In various embodiments, the air inlet can be in fluid communication with the first inflatable tube.

In various embodiments, the non-stretchable fabric layer can comprise nylon coated with a first polymeric coating compound. The stretchable fabric layer can comprise nylon coated with a second polymeric coating compound. In various embodiments, the second polymeric coating compound can be thicker than the first polymeric coating compound.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Aircraft wings may generate most of the lift associated with holding an aircraft in the air. The air may resist aircraft motion in the form of aerodynamic drag. Ice formation on a leading edge of lift and control surfaces may disrupt or destroy the smooth flow of air along those surfaces, increasing drag while decreasing the aircraft's control and the aircraft's ability to create lift. Accordingly, ice formation on the leading edge of a wing may prevent an aircraft from taking off, or may interfere with flight.

Figure 1:
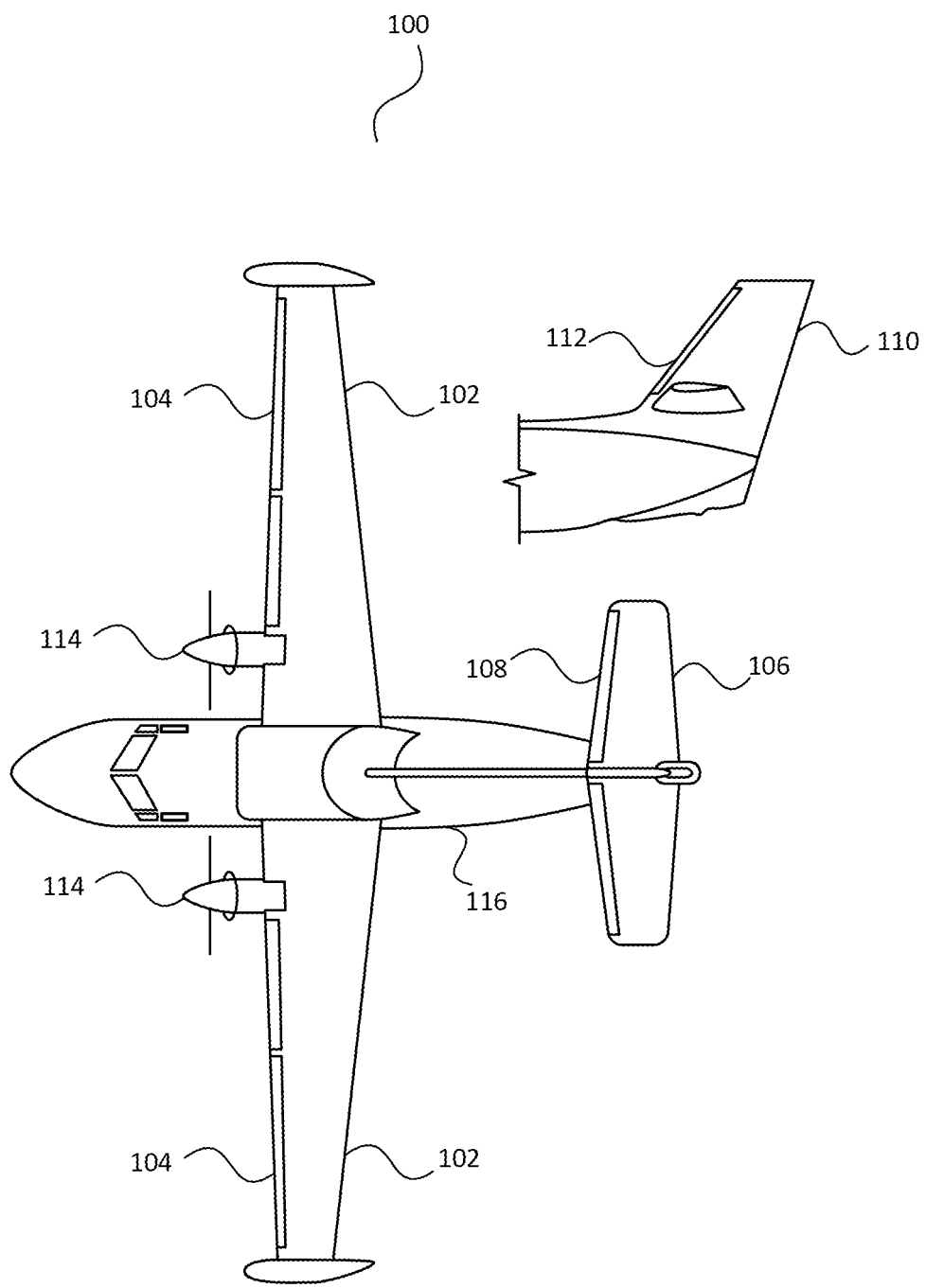
FIG. 1 illustrates an aircraft, in accordance with various embodiments.

In reference to FIG. 1, an aircraft 100 is shown, in accordance with various embodiments. The aircraft 100 can comprise wings 102 to generate lift, and horizontal stabilizer 106 and vertical stabilizer 110 to maintain control of the aircraft 100. The aircraft 100 can also comprise turbine engines 114 to provide thrust, and a fuselage 116 to hold the aircraft 100 components together and carry passenger and cargo. The wings 102 can further comprise a pneumatic deicer system 104 along the leading edges of the wings 102. In various embodiments, the horizontal stabilizer 106 can comprise a pneumatic deicer system 108 and the vertical stabilizer 110 can comprise a pneumatic deicer system 112 along the leading edges of the stabilizers. The aircraft 100 can have one pneumatic deicer system or multiple deicer systems.

Figure 2:
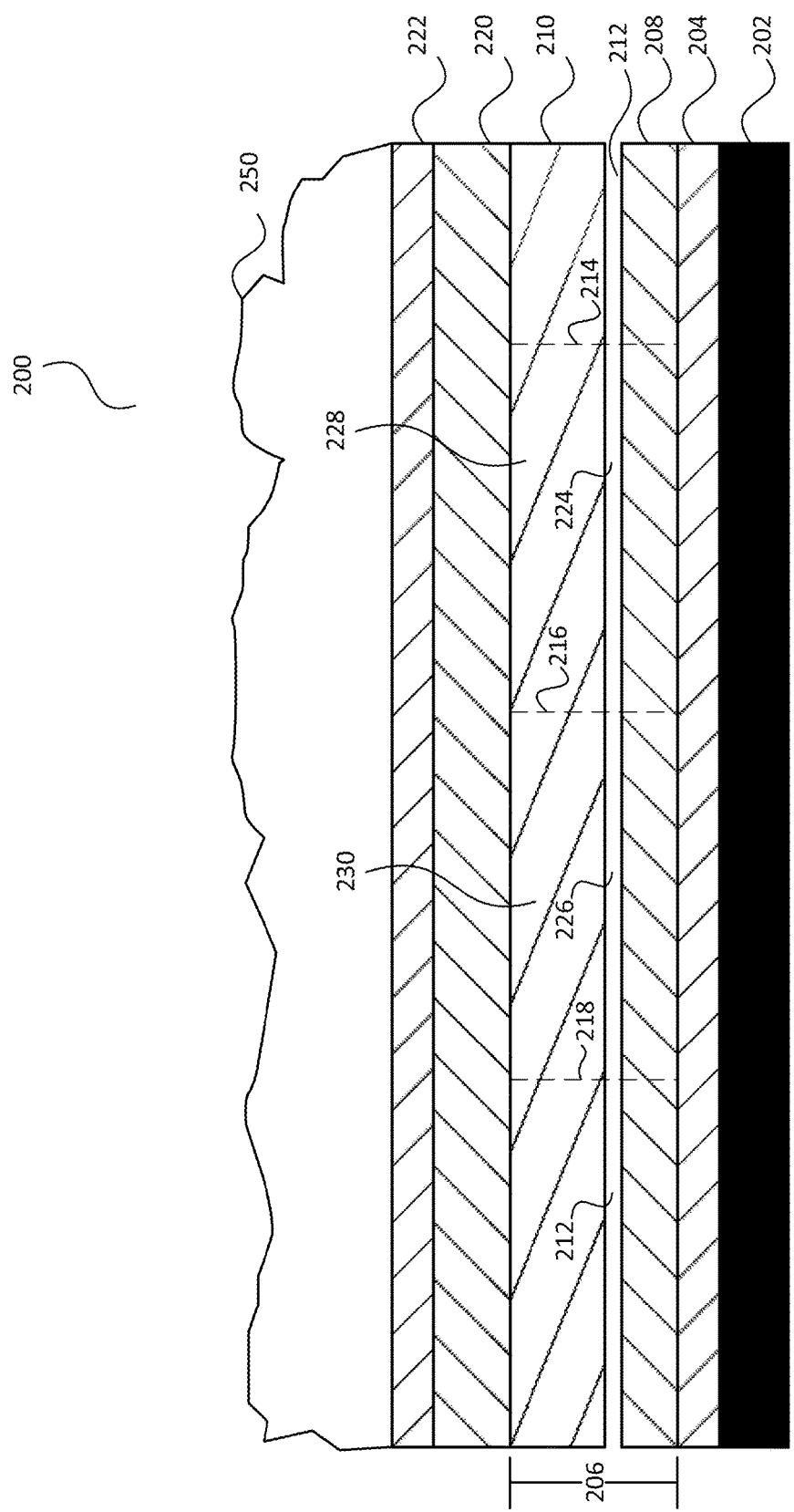
FIG. 2 illustrates a cross section of a pneumatic deicer boot, in accordance with various embodiments.

In reference to FIG. 2, pneumatic deicer boot 200 is shown, in accordance with various embodiments. Any of the pneumatic deicer systems 104, 108 and 112 can comprise pneumatic deicer boot 200. The pneumatic deicer boot 200 can be coupled to a leading edge 202. In various embodiments, the leading edge 202 can be the leading edges of wings 102, and stabilizers 106 and 110. In various embodiments, the pneumatic deicer boot 200 can comprise an installation layer 204, an inflatable carcass 206 overlaying the installation layer 204, a polymer layer 220 overlaying the inflatable carcass 206, and a weathering layer 222 overlaying the polymer layer 220. In various embodiments, the polymer layer 220 can comprise natural rubber, synthetic rubber, neoprene or the like.

In various embodiments, the inflatable carcass 206 can comprise a non-stretchable fabric layer 208, a plurality of gaps 212, and a stretchable fabric layer 210. The stretchable fabric layer 210 can have elastomeric properties such that it can be stretched by an external force to form a new geometry, but will almost immediately return to its original geometry when the external force is released. However, the non-stretchable fabric layer 208 cannot be stretched to form a new geometry.

In various embodiments, the non-stretchable fabric layer 208 can comprise nylon coated with a first polymeric coating compound. The stretchable fabric layer 210 can comprise nylon coated with a second polymeric coating compound. In various embodiments, the second polymeric coating compound is thicker than the first polymeric coating compound. An optimum thickness coating of polyurethane can create a more stretchable fabric. The coats of polyurethane can be compounded to provide protection against environments such as UV and ozone exposure, and have flame and fungus resistance properties. Polyurethanes are useful because they tend to resist hydrolysis and show no degradation for prolonged periods of exposure to high humidity and temperatures. The polymeric coatings on the stretchable fabric layer 210 and the non-stretchable fabric layer 208 can also form more conducive materials for laser welding.

In various embodiments, the non-stretchable fabric layer 208 can be coupled to the installation layer 204 and the stretchable fabric layer 210 can be bonded to the polymer layer 220. The installation layer 204 can comprise polyurethane or neoprene. In various embodiments, the installation layer 204 can also comprise an adhesive layer for adhering the installation layer 204 to the wings 102 or the stabilizers 106 and 110. In various embodiments, the weathering layer 222 can comprise polyurethane or neoprene.

In various embodiments, the non-stretchable fabric layer 208 and the stretchable fabric layer 210 can be welded together at a plurality of weld lines, including a first weld line 214, a second weld line 216, and a third weld line 218. Each of the plurality of weld lines can range in width between about 0.10 centimeters to about 0.40 centimeters, or between about 0.15 centimeters to about 0.35 centimeters, or between about 0.20 centimeters to about 0.30 centimeters. The plurality of gaps 212 can comprise a first gap 224 and a second gap 226. In various embodiments, the first weld line 214, the second weld line 216, and the first gap 224 can form a first inflatable tube 228. In various embodiments, the second weld line 216, the third weld line 218, and the second gap 226 can form a second inflatable tube 230. In various embodiments, the inflatable carcass 206 can comprise a plurality of inflatable tubes, including the first inflatable tube 228 and the second inflatable tube 230, formed between the plurality of weld lines and the plurality of gaps 212. The plurality of inflatable tubes can be inflated with compressed air to break apart a piece of ice 250.

Figure 3:
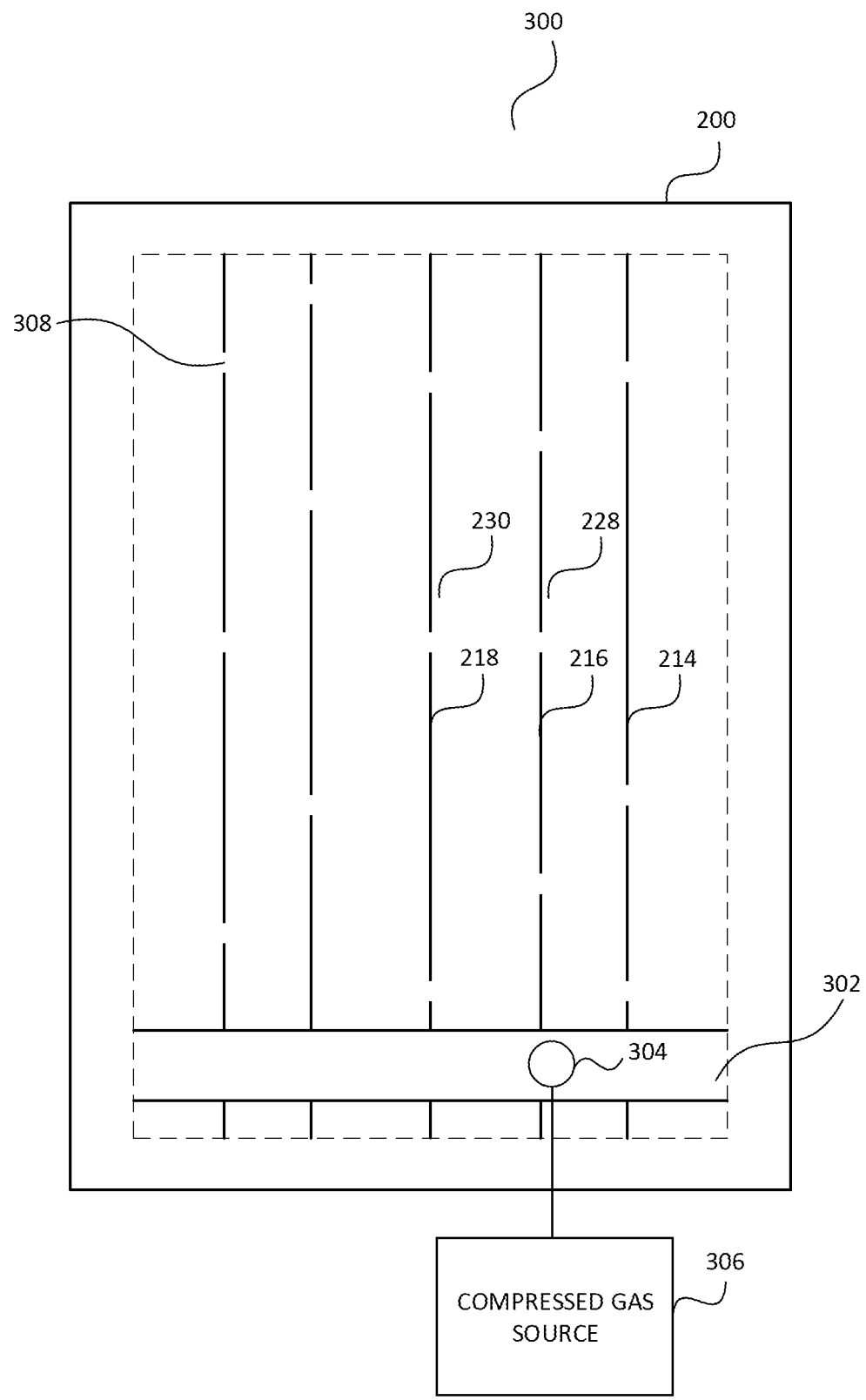
FIG. 3 illustrates a pneumatic deicer system, in accordance with various embodiments.

The plurality of weld lines are regions where the stretchable fabric layer 210 and the non-stretchable fabric layer 208 are bonded together to form a seal between the stretchable fabric layer 210 and the non-stretchable fabric layer 208. The seal formed along the plurality of weld lines between the stretchable fabric layer 210 and the non-stretchable fabric layer 208 can hold down the stretchable fabric layer 210 when the plurality of inflatable tubes are inflated. The plurality of weld lines can help the stretchable fabric layer 210 form a new geometry when the plurality of inflatable tubes is inflated. Sewing the stretchable fabric layer 210 and the non-stretchable fabric layer 208 to form the seal between the two layers can create stress concentration points which can lead to failure when the plurality of inflatable tubes is inflated. In various embodiments, the stretchable fabric layer 210 and the non-stretchable fabric layer 208 are welded together using a laser welder at the plurality of weld lines. Laser welding the stretchable fabric layer 210 and the non-stretchable fabric layer 208 together can create welding lines which do not have stress concentration points and are less prone to failure In reference to FIG. 3, a pneumatic deicer system 300 comprising the pneumatic deicer boot 200 is shown, in accordance with various embodiments. In various embodiments, the pneumatic deicer system 300 can comprise the pneumatic deicer boot 200 and a compressed gas source 306, configured to deliver compressed gas to the pneumatic deicer boot 200. The compressed gas source 306 can comprise any suitable compressed gas or air, for example engine bleed air. Engine bleed air is compressed air taken from the compressor stage of a gas turbine upstream of its fuel-burning sections. Bleed air may be used for a variety of purposes on an aircraft, such as, for example, cabin pressurization, cross-starting another engine, engine cooling, pressurizing hydraulic reservoirs, and the like.

In various embodiments, the pneumatic deicer boot 200 can comprise a manifold 302 formed within the pneumatic deicer boot 200. The manifold 302 can be in fluid communication with the plurality of inflatable tubes, including the first inflatable tube 228 and the second inflatable tube 230. In various embodiments, an air inlet 304 can be coupled to the installation layer 204. In various embodiments, the air inlet 304 can be coupled to the installation layer 204 using laser welding. The air inlet 304 can be in fluid communication with the manifold 302 and the compressed gas source 306. The manifold 302 and the air inlet 304 can assist in delivering compressed air from the compressed gas source 306 to inflate the plurality of inflatable tubes. The plurality of inflatable tubes can comprise a plurality of air passage gaps, such as an air passage gap 308. The plurality of air passage gaps can be spaced intermittently throughout the plurality of inflatable tubes to assist in even inflation and deflation of the plurality of inflatable tubes in response to compressed air being delivered and/or removed.

Figure 4:
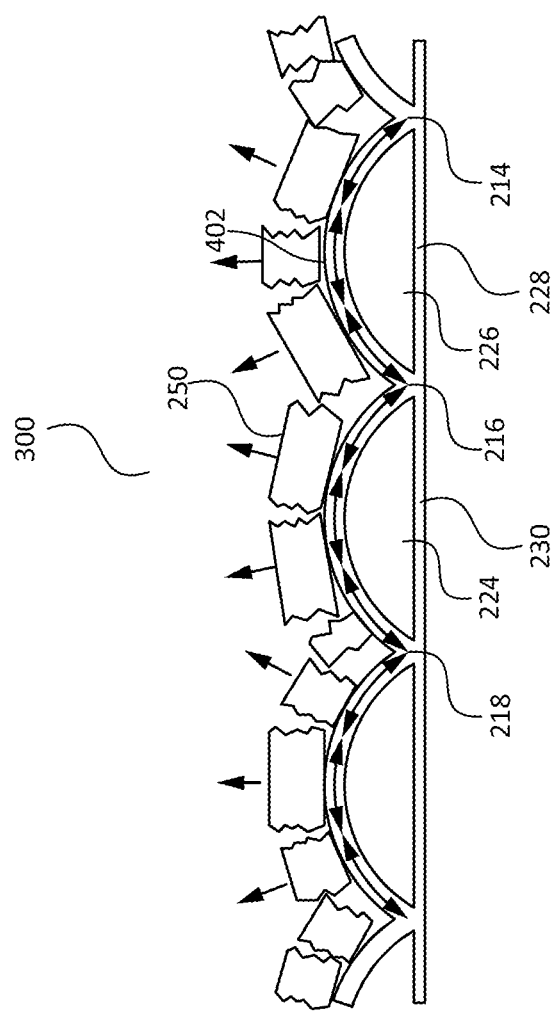
FIG. 4 illustrates a cross section of a pneumatic deicer boot in an engaged position, in accordance with various embodiments.

In reference to FIG. 4, portions of a cross-section of the pneumatic deicer system 300 is shown, in accordance with various embodiments. FIG. 4 shows the pneumatic deicer boot 200 in an engaged, or inflated, position. Compressed gas from the compressed gas source 306 can be directed through the air inlet 304 and the manifold 302 to inflate the plurality of inflatable tubes of the pneumatic deicer boot 200, including the first inflatable tube 228 and the second inflatable tube 230. As shown, the inflated pneumatic deicer boot 200 may comprise a plurality of ridges 402 disposed between the plurality of weld lines. The geometry of these ridges 402, in the inflated state, may enable the ice 250 to crack and dislodge from the leading edges of the wings 102 and the stabilizers 106 and 110. The ice 250 may then be blown away by the airflow. The pneumatic deicer boot 200 may then return to an idle position, for example the position shown in FIG. 2.

Figure 5:
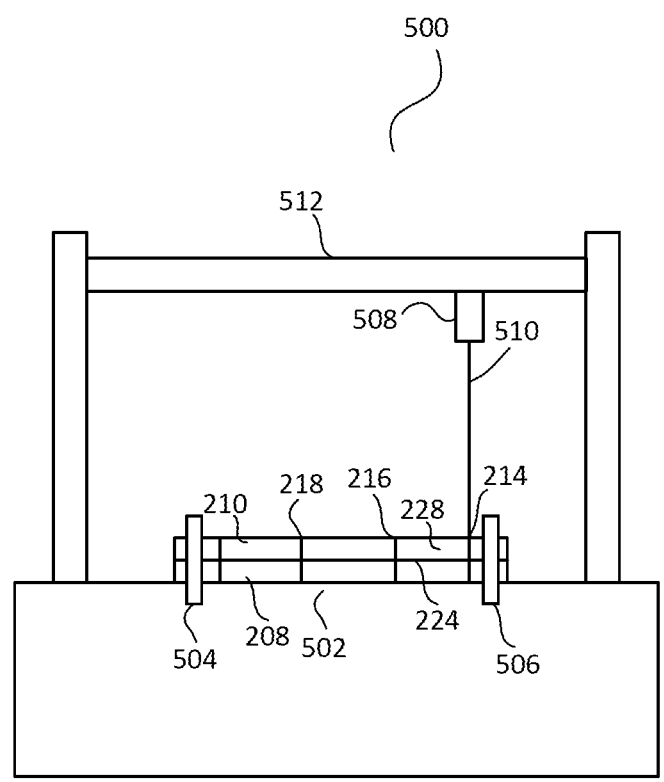
FIG. 5 illustrates a laser welding apparatus laser welding a pneumatic deicer boot, in accordance with various embodiments.

In reference to FIG. 5, a laser welding apparatus 500 is shown, in accordance with various embodiments. In various embodiments, the laser welding apparatus 500 can comprise a laser welder device 508 configured to emit a concentrated laser 510, and the laser welder device 508 can be coupled to a guided track 512. The laser welder device 508 can move back and forth across the guided track 512. In various embodiments, the laser welder device 508 is controlled by a software program, which can command the movements of the laser welder device 508 based on a desired input configuration. In various embodiments, the concentrated laser 510 can comprise an infrared laser with wavelengths between 750 nanometers and 1050 nanometers.

In various embodiments, the laser welding apparatus 500 can be used to laser weld the non-stretchable fabric layer 208 to the stretchable fabric layer 210 to form the inflatable carcass 206. In various embodiments, the laser welding apparatus 500 can comprise a first clamp 504 and a second clamp 506 to hold the stretchable fabric layer 210 and the non-stretchable fabric layer 208 at a welding position 502. The laser welder device 508 can traverse the guided track 512 to laser weld the first weld line 214 and the second weld line 216 with the concentrated laser 510. In various embodiments, after the laser welding apparatus 500 laser welds the first weld line 214 and the second weld line 216, the first weld line 214, the second weld line 216, and the first gap 224 can form the first inflatable tube 228. In various embodiments, the first weld line 214 and the second weld line 216 can have gaps, such as the plurality of air passage gaps illustrated in FIG. 3.

Figure 6:
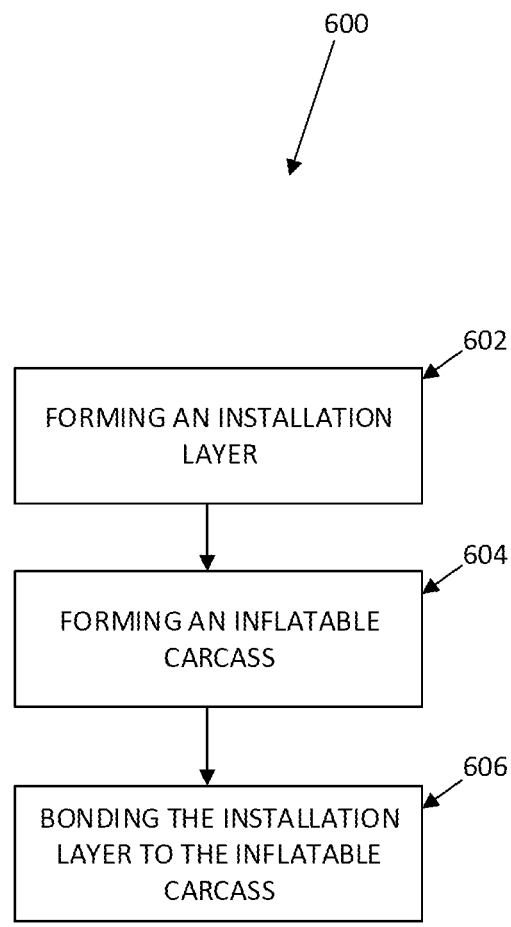
FIG. 6 illustrates a method of manufacture for a pneumatic deicer boot, in accordance with various embodiments.

In reference to FIG. 6, a method of manufacture 600 for a pneumatic deicer boot (shown as pneumatic deicer boot 200) is shown, in accordance with various embodiments. The method of manufacture 600 can include the steps of forming an installation layer (shown as installation layer 204) (step 602), forming an inflatable carcass (shown as inflatable carcass 206) (step 604), and bonding the installation layer to the inflatable carcass (step 606). The bonding can be done using adhesive bonding or laser welding.

Figure 7:
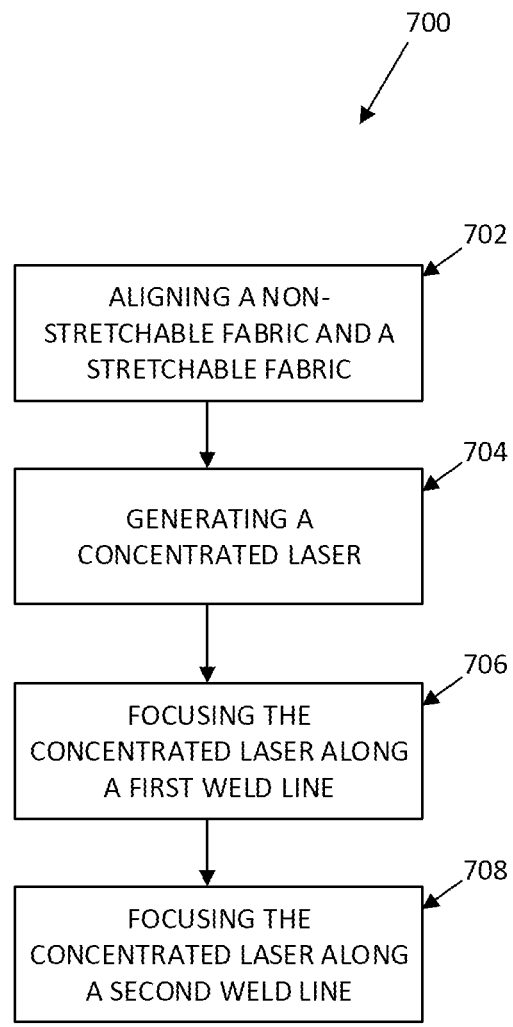
FIG. 7 illustrates a method of forming an inflatable carcass, in accordance with various embodiments.

In reference to FIG. 7, a method 700 of forming an inflatable carcass (shown as inflatable carcass 206) is illustrated, in accordance with various embodiments. The method 700 can comprise the steps of aligning a non-stretchable fabric layer (shown as non-stretchable fabric layer 208) and a stretchable fabric layer (shown as stretchable fabric layer 210) at a welding position (shown as welding position 502) (step 702), generating a concentrated laser (shown as concentrated laser 510) (step 704), focusing the concentrated laser along a first weld line (shown as first weld line 214) to laser weld the stretchable fabric layer to the non-stretchable fabric layer (step 706), and focusing the concentrated laser along a second weld line (shown as second weld line 216) to laser weld the stretchable fabric and the non-stretchable fabric. In various embodiments, a first gap (shown as first gap 224) remains between the stretchable fabric and the non-stretchable fabric, and the first gap, the first weld line and the second weld line form a first inflatable tube (shown as first inflatable tube 228).

In various embodiments the method of manufacture 600 can further comprise forming a polymer layer (shown as polymer layer 220) on the stretchable fabric layer of the inflatable carcass. In various embodiments, the method of manufacture 600 can further comprise forming a weathering layer (shown as weathering layer 222) on the polymer layer.

Forming the weathering layer allows for better weather protection of the pneumatic deicer boot and the pneumatic deicer system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacture for a pneumatic deicer boot, comprising:
   aligning a non-stretchable fabric layer and a stretchable fabric layer at a welding position;
   generating a concentrated laser;
   focusing the concentrated laser along a first weld line to laser weld together the stretchable fabric layer and the non-stretchable fabric layer, wherein the first weld line includes a plurality of air passage gaps to assist in even inflation and deflation between adjacent inflatable tubes of a plurality of inflatable tubes; and
   focusing the concentrated laser along a second weld line to laser weld together the stretchable fabric layer and the non-stretchable fabric layer, wherein the second weld line includes a plurality of air passage gaps to assist in even inflation and deflation between the adjacent inflatable tubes of the plurality of inflatable tubes, wherein a first gap remains between the stretchable fabric layer and the non-stretchable fabric layer, and wherein the first gap, the first weld line and the second weld line form a first inflatable tube of the plurality of inflatable tubes; and
   bonding an installation layer to the non-stretchable fabric layer of the inflatable carcass.

2. The method of manufacture of claim 1, wherein the method of manufacture further comprises forming a polymer layer on the stretchable fabric layer of the inflatable carcass.

3. The method of manufacture of claim 2, wherein the method of manufacture further comprises forming a weathering layer on the polymer layer.

4. The method of manufacture of claim 3, wherein the method of manufacture further comprises bonding an air inlet to the installation layer.

5. The method of manufacture of claim 4, wherein the concentrated laser is an infrared laser.

6. The method of manufacture of claim 5, wherein the non-stretchable fabric layer comprises nylon coated with a first polymeric coating compound.

7. The method of manufacture of claim 6, wherein the stretchable fabric layer comprises nylon coated with a second polymeric coating compound.

8. The method of manufacture of claim 7, wherein the second polymeric coating compound is thicker than the first polymeric coating compound.

9. A pneumatic deicer boot, comprising:
   an installation layer; and
   an inflatable carcass, comprising:
      a non-stretchable fabric layer;
      a stretchable fabric layer, wherein the non-stretchable fabric layer and the stretchable fabric layer are laser welded together at a first weld line and a second weld line, wherein the first weld line includes a plurality of air passage gaps to assist in even inflation and deflation between adjacent inflatable tubes of a plurality of inflatable tubes and wherein the second weld line includes a plurality of air passage gaps to assist in even inflation and deflation between the adjacent inflatable tubes of the plurality of inflatable tubes; and
      a first inflatable tube of the plurality of inflatable formed by a gap between the first weld line and the second weld line.

10. The pneumatic deicer boot of claim 9, wherein the pneumatic deicer boot further comprises a polymer layer.

11. The pneumatic deicer boot of claim 10, wherein the pneumatic deicer boot further comprises a weathering layer.

12. The pneumatic deicer boot of claim 11, wherein the pneumatic deicer boot further comprises a manifold in fluid communication with the first inflatable tube.

13. The pneumatic deicer boot of claim 12, wherein the pneumatic deicer boot further comprises an air inlet disposed at the installation layer and in fluid communication with the manifold.

14. The pneumatic deicer boot of claim 13, wherein the non-stretchable fabric layer comprises nylon coated with a first polymeric coating compound.

15. The pneumatic deicer boot of claim 14, wherein the stretchable fabric layer comprises nylon coated with a second polymeric coating compound.

16. The pneumatic deicer boot of claim 15, wherein the second polymeric coating compound is thicker than the first polymeric coating compound.

17. A pneumatic deicer system, comprising:
a pneumatic deicer boot, wherein the pneumatic deicer boot comprises:
an installation layer;
an inflatable carcass bonded to the installation layer, comprising:
a non-stretchable fabric layer;
a stretchable fabric layer, wherein the non-stretchable fabric layer and the stretchable fabric layer are laser welded together at a first weld line and a second weld line, wherein the first weld line includes a plurality of air passage gaps to assist in even inflation and deflation between adjacent inflatable tubes of a plurality of inflatable tubes and wherein the second weld line includes a plurality of air passage gaps to assist in even inflation and deflation between the adjacent inflatable tubes of the plurality of inflatable tubes; and
a first inflatable tube of the plurality of inflatable formed by a gap between the first weld line and the second weld line;
an air inlet coupled to the installation layer and in fluid communication with the first inflatable tube; and
a compressed air source in fluid communication with the air inlet.

18. The pneumatic deicer system of claim 17, wherein the non-stretchable fabric layer comprises nylon coated with a first polymeric coating compound.

19. The pneumatic deicer system of claim 18, wherein the stretchable fabric layer comprises nylon coated with a second polymeric coating compound.

20. The pneumatic deicer system of claim 19, wherein the second polymeric coating compound is thicker than the first polymeric coating compound.

\* \* \* \* \*